Aug. 8, 1933.                B. M. HESS                1,921,752
                        MIRROR EQUIPPED STRUCTURE
                           Filed Aug. 17, 1932
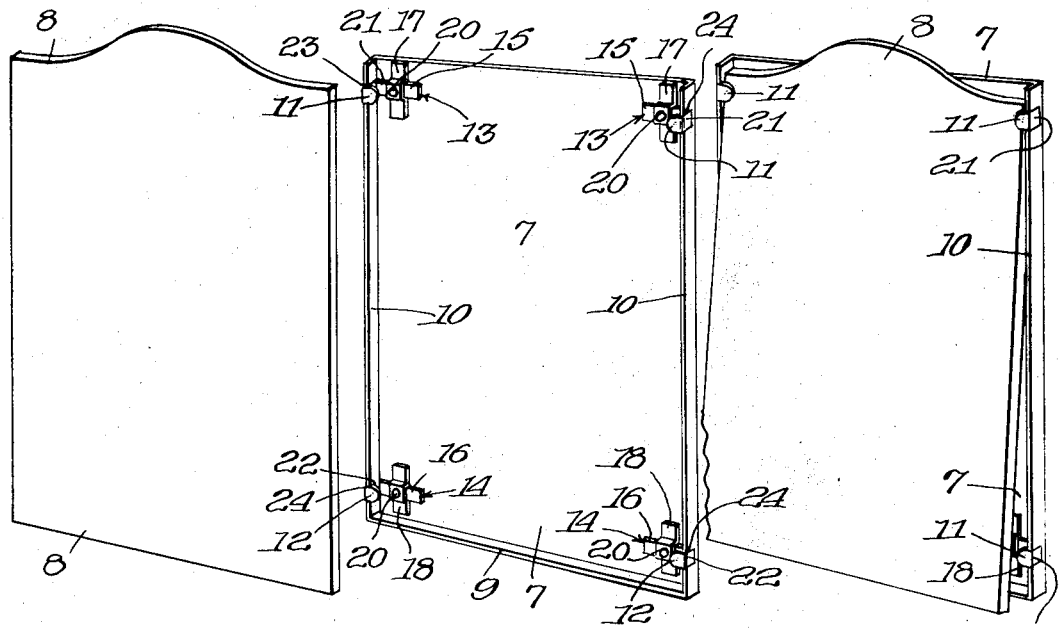
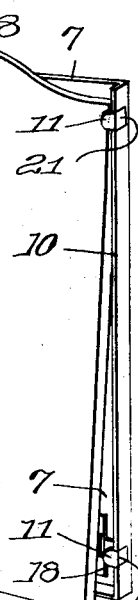
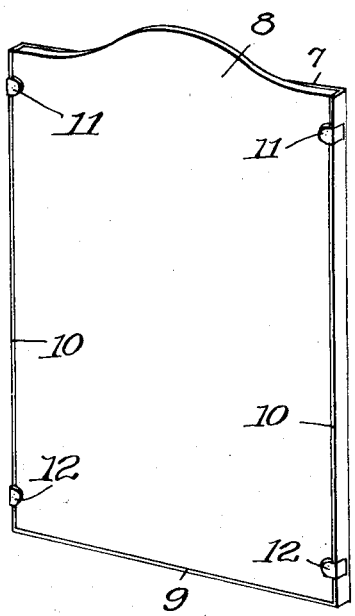
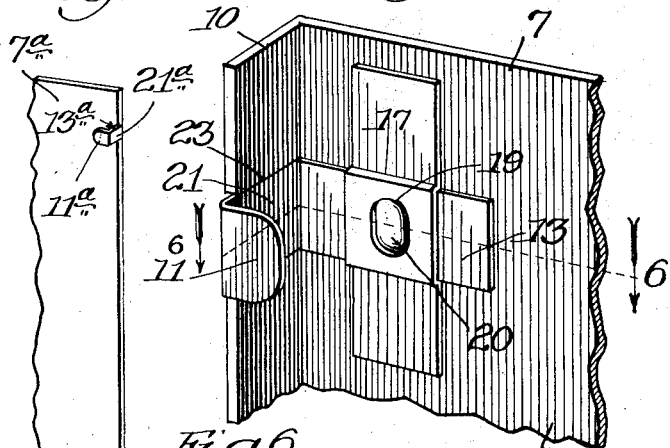
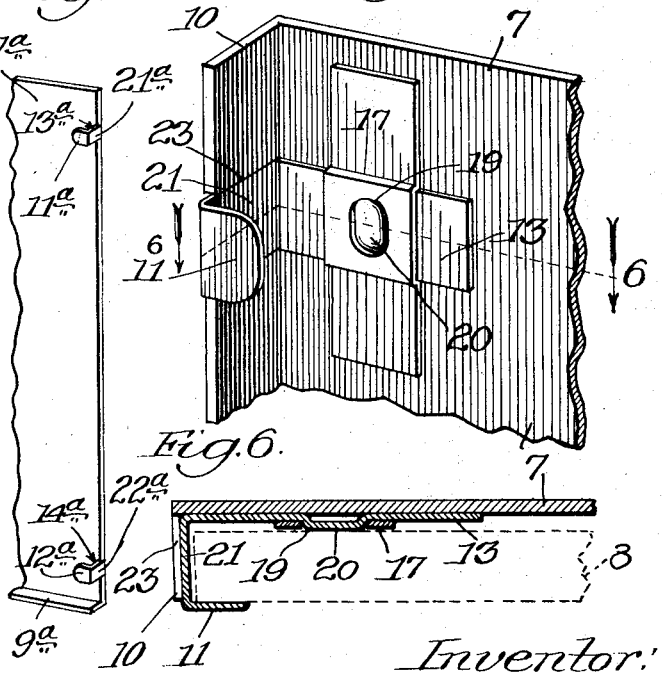
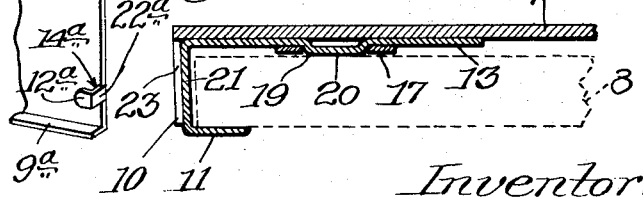
Inventor:
Bryce M. Hess,
By Dyrenforth, Lee, Chritton & Wiles,
Att'ys Patented Aug. 8, 1933

1,921,752

UNITED STATES PATENT OFFICE 1,921,752

MIRROR-EQUIPPED STRUCTURE

Bryce M. Hess, Chicago, Ill.

Application August 17, 1932. Serial No. 629,211

5 Claims. (Cl. 45—18)

My invention relates to mirror-equipped structures and particularly mirror-equipped doors of cabinets comprising a backing member, usually in the form of a plate of substantially the same area as the opening for which it is to form a closure and hinged to a side wall of the cabinet, and a mirror portion applied to the front face of the backing member to extend over the same; my present invention being in the nature of an improvement on the subject matter of my Patent No. 1,881,576, dated Oct. 11, 1932.

Referring to the accompanying drawing:

Figure 1 is a perspective view of a glass mirror forming an element of the door of a cabinet.

Figure 2 is a perspective view of a backing member forming another element of the door and with which the mirror of Fig. 1 is to be assembled.

Figure 3 is a perspective view showing the manner in which the mirror is assembled with the backing member.

Figure 4 is a perspective view of the assembled mirror and backing member.

Figure 5 is an enlarged fragmentary view showing one of the similar lug-equipped corner portions of the backing member.

Figure 6 is a section taken at the line 6 on Fig. 5 and viewed in the direction of the arrow; and Figure 7, a fragmentary perspective view of a modification of the preceding construction.

Referring to the particular construction shown in Figs. 1-6, inclusive, a backing member shown as forming an element of a cabinet door is represented at 7, this backing member, as is common with backing members now in use, being of a size and shape preferably to completely cover the opening in the front of the cabinet-casing (not shown) and, as is common in practice, would have secured thereto along one vertical edge one of the leaves of the hinges by which the door is hingedly connected with the cabinet casing referred to, the other leaves of the hinges referred to being connected to the casing in accordance with common practice.

The backing member 7 is shown as provided along its lower edge with a seating portion upon which the mirror portion of the door and represented at 8, would rest at its lower edge, this seating portion in the particular construction shown being in the form of a ledge-forming flange 9 extending forwardly from, and entirely across, the lower edge of the backing member 7, and being preferably formed integrally with the body member as by bending the lower edge of the latter into the shape shown.

The backing member 7 is also provided at its vertical sides with means adapted to lap the vertical edge faces of the mirror 8 and the front face of the mirror at its lateral vertical edge portions adjacent the upper and lower edges of the mirror to prevent the mirror from shifting laterally in either direction relative to the backing member 7 and to hold the mirror against forward displacement on the backing member.

In the particular construction shown the backing member 7 is provided at its vertical edges with forwardly extending flanges 10 shown as integral with the body portion of the backing member between which flanges the mirror 8 is positioned in use, and adjacent the upper and lower edges of the backing member 7 with pairs of upper and lower lugs 11 and 12, respectively, adapted to overlap the front face of the mirror 8 when assembled with the backing member. The lugs 11 and 12 are shown as constituting the inwardly turned terminal portions of upper and lower L-shaped strip members 13 and 14, respectively, which fit flatwise at their portions 15 and 16, respectively, against the faces of the backing members 7 and to which they are secured as by upper and lower straps 17 and 18, respectively, extending crosswise of the members 13 and 14 and secured at their projecting ends to the backing member as for example by welding them thereto, the straps 17 and 18 containing openings 19 into which projections 20 on the members 13 and 14 extend, the members 13 and 14 being shown as extending at their outwardly projecting portions 21 and 22, respectively, into slots 23 and 24 in the side flanges 10.

As will be understood either the flanges 10 or the portions 21 and 22 of the members 13 and 14, or both these flanges and said portions, may serve as lateral abutments for the mirror 8 and constitute means for preventing lateral shifting of the mirror, and if desired, the flanges 10 which, in any event, when used, form stiffening means for the backing member 7, may be omitted.

In assembling the mirror 8 with the backing member 7, the mirror is first inserted at the end thereof which extends at the top of the door in the finished structure, into a position between the backing member 7 and the inwardly extending upper lugs 11 as shown in Fig. 3 and the mirror then slid toward the upper end of the backing member to a position in which the opposite end of the mirror clears the inwardly extending lower lugs 12 (the upper lugs 11 being spaced a sufficient distance from the backing member 7 to permit of the movement of the mirror as stated) whereupon the mirror is moved at its last-referred-to end toward the backing member and then slid in the reverse direction beneath the lower lugs 12 to seating position on the ledge 9 as shown in Fig. 4.

It will be understood from the foregoing that the mirror 8 may be assembled with the backing member 7 with comparative ease and quickly and when so assembled will be held securely against displacement relative to the backing member.

Furthermore, and as a matter of practical importance, the construction permits the mirror while inclined to be inserted below the upper lugs 11 from below and moved upwardly above the supporting means and thence inwardly at the bottom edge and then lowered to extend back of the lower lugs 12, whereby the mirror is applied to the backing member with relatively slight sliding movement to avoid injury to the silvering of the mirror.

It is preferred that the ledge 9 be provided to extend continuously throughout the entire width of the member 7 inasmuch as this ledge not only forms a desirable seat for the mirror but stiffens the backing member.

Figure 7 shows a construction omitting the side flanges 10. In this construction the backing member herein represented at 7ª and provided with a supporting ledge 9ª as in the construction of the preceding figures of the drawing, is provided along its opposite vertical edges, as shown along one thereof, with upper and lower members 13ª and 14ª located as in the case of the members 13 and 14 of Figs. 1–6, inclusive. The members 13ª and 14ª have forwardly projecting portions 21ª and 22ª, respectively, between which the mirror would extend and which would form means for preventing lateral shifting of the mirror, and inwardly directed lugs 11ª and 12ª, adapted to overlap the front of the mirror, the upper lugs 11ª being spaced from the backing member 7ª a distance greater than the thickness of the mirror to permit of the assembling of the mirror with the backing member as explained of the construction in the preceding figures of the drawing.

The members 13ª and 14ª may be provided in any suitable way. Preferably they are formed separate from the backing member 7ª and, by way of example, may be provided as in Figs. 1–6, inclusive, or welded to the backing member, though, if desired, they may be formed as integral parts of the backing sheet, it being understood that so far as the broad feature of my invention is concerned, the members 13 and 14 of Figs. 1–6, inclusive, and the members 13ª and 14ª of Fig. 7 may be provided on the backing member in any desirable way.

In the case of either of the constructions shown the seating ledge for the lower end of the mirror may, if desired, be formed to present a recess to receive the mirror as for example by providing the ledge with an upwardly extending flange extending therealong and lapping the front of the mirror.

While I have illustrated and described certain particular constructions embodying my invention, I do not wish to be understood as intending to limit it thereto as the same may be variously modified and altered without departing from the spirit of my invention.

What I claim as new, and desire to secure by Letters Patent, is:

1. A device of the character described comprising a backing member adapted for vertical disposition, mirror-supporting means on the backing member engageable by the lower end of the mirror, means on the backing member and between which the mirror extends, for preventing lateral shifting of the mirror, and lug means adjacent the upper and lower ends of the mirror and overlapping the front of the mirror, the upper lug means being spaced from the backing a greater distance than the thickness of the mirror, the construction thus permitting the mirror while inclined to be inserted beneath the upper lug means from below and moved upwardly above the supporting means and the lower lug means and thence inwardly at the bottom and lowered to become positioned between the lower lug means and the backing member and seat on said supporting means.

2. A device of the character described comprising a backing member adapted for vertical disposition, mirror-supporting means on the backing member engageable by the lower end of the mirror and flanges on the vertical edges of the backing member and between which the mirror extends, for preventing lateral shifting of the mirror, said backing member having portions adjacent the upper and lower ends of the mirror at the sides of the mirror and terminating in lugs overlapping the front of the mirror, the upper ones of the lugs being spaced from the backing member a greater distance than the thickness of the mirror, the construction thus permitting the mirror while inclined to be inserted beneath the upper ones of said lugs from below and moved upwardly above the supporting means and the lower ones of said lugs and thence inwardly at the bottom and lowered to become positioned between the lower ones of said lugs and the backing member and seat on said supporting means.

3. A device of the character described comprising a backing member adapted for vertical disposition, mirror-supporting means on the backing member engageable by the lower end of the mirror and flanges on the vertical edges of the backing member, said backing member having portions adjacent the upper and lower ends of the mirror at the sides of the mirror and operating to prevent lateral shifting of the mirror, said portions terminating in lugs overlapping the front of the mirror, the upper ones of said lugs being spaced from the backing member a greater distance than the thickness of the mirror the construction thus permitting the mirror while inclined to be inserted beneath the upper ones of said lugs from below and moved upwardly above the supporting means and the lower ones of said lugs and thence inwardly at the bottom and lowered to become positioned between the lower ones of said lugs and the backing member and seat on said supporting means.

4. A device of the character described comprising a backing member adapted for vertical disposition, mirror-supporting means on the backing member engageable by the lower end of the mirror, and means on said backing member for preventing lateral and forward displacement of the mirror comprising portions between which the mirror extends and portions adjacent the top and bottom of the mirror and overlapping the front of the mirror, the upper ones of said last-referred-to portions being spaced from the backing a greater distance than the thickness of the mirror, the construction thus permitting the mirror while inclined to be inserted beneath the upper ones of said portions from below and moved upwardly above the supporting means and the lower ones of said portions, thence inwardly at the bottom and lowered to become positioned between the lower ones of said portions and the backing member and seat on said supporting means.

5. A device of the character described comprising a backing member adapted for vertical disposition, and mirror-supporting means on the backing member engageable by the lower end of the mirror, said backing member having portions adjacent the upper and lower ends of the mirror at the sides of the mirror and operating to prevent lateral shifting of the mirror, said portions terminating in lugs overlapping the front of the mirror, the upper ones of said lugs being spaced from the backing member a greater distance than the thickness of the mirror the construction thus permitting the mirror while inclined to be inserted beneath the upper ones of said lugs from below and moved upwardly above the supporting means and the lower ones of said lugs and thence inwardly at the bottom and lowered to become positioned between the lower ones of said lugs and the backing member and seat on said supporting means.

BRYCE M. HESS.